(12) United States Patent
Larsson et al.

(10) Patent No.: US 10,685,557 B2
(45) Date of Patent: Jun. 16, 2020

(54) EMERGENCY NOTIFICATION SYSTEM

(71) Applicant: Axis AB, Lund (SE)

(72) Inventors: Ingemar Larsson, Lund (SE); Anders Hansson, Lund (SE); Daniel Andersson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/579,873

(22) Filed: Sep. 24, 2019

(65) Prior Publication Data

US 2020/0126400 A1 Apr. 23, 2020

(30) Foreign Application Priority Data

Oct. 23, 2018 (EP) ..................................... 18201911

(51) Int. Cl.
| | |
|---|---|
| *F21V 23/00* | (2015.01) |
| *G08B 25/14* | (2006.01) |
| *G08B 25/10* | (2006.01) |
| *H04W 4/90* | (2018.01) |
| *H04W 4/33* | (2018.01) |
| *H04W 4/029* | (2018.01) |

(52) U.S. Cl.
CPC ............. *G08B 25/14* (2013.01); *G08B 25/10* (2013.01); *H04W 4/029* (2018.02); *H04W 4/33* (2018.02); *H04W 4/90* (2018.02)

(58) Field of Classification Search
USPC ........................................................ 340/506
See application file for complete search history.

(56) References Cited

U.S. PATENT DOCUMENTS

| | | |
|---|---|---|
| 4,612,535 A | 9/1986 | Sequin et al. |
| 6,552,963 B2 | 4/2003 | Baranek et al. |
| 2003/0234725 A1 | 12/2003 | Lemelson et al. |
| 2011/0095895 A1* | 4/2011 | Chero .................... G08B 7/064 340/628 |
| 2011/0227728 A1* | 9/2011 | Mathis ................... G08B 7/064 340/539.29 |
| 2012/0126979 A1 | 5/2012 | Kellen et al. |
| 2015/0213703 A1 | 7/2015 | Filson et al. |
| 2016/0232774 A1 | 8/2016 | Noland et al. |
| 2018/0113577 A1* | 4/2018 | Burns ................. H04N 21/4223 |
| 2019/0371148 A1* | 12/2019 | Bailey .................... H05B 45/20 |

FOREIGN PATENT DOCUMENTS

| | | |
|---|---|---|
| GB | 2459152 A | 10/2009 |
| JP | 2015-94982 A | 5/2015 |
| WO | 2009/105603 A1 | 8/2009 |
| WO | 2011/034247 A1 | 3/2011 |

* cited by examiner

*Primary Examiner* — Brent Swarthout
(74) *Attorney, Agent, or Firm* — Xsensus LLP

(57) ABSTRACT

The present invention relates to an emergency notification system where indicators are mounted on or in a building in such a way that optical or thermal signals emitted from the indicators form a time-variant indication detectable outside the building of an emergency event taking place inside the building. Sensors detecting a predetermined sound are mounted inside the building and are each connected to a nearby indicator. When a sensor makes a detection, it sends event information to its associated indicator which will prompt the indicator to emit a first optical or thermal signal. Based on a signal from a timer connected to the indicator, a property of the first signal will change after a certain time has passed, thereby providing the time-variant indication.

15 Claims, 3 Drawing Sheets

EMERGENCY NOTIFICATION SYSTEM

CROSS-REFERENCE TO RELATED APPLICATION

The present application claims priority to EP 18201911.7, filed Oct. 23, 2018, the entire contents of which is incorporated herein by reference.

TECHNICAL FIELD OF THE INVENTION

The present invention relates to emergency notification systems and methods.

BACKGROUND OF THE INVENTION

Many buildings are equipped with emergency alarm systems, detecting fire, burglary or other types of events. Such alarm systems can be more or less sophisticated, ranging from standalone fire alarm units to advanced monitoring systems with surveillance cameras analysing images to find potentially hazardous items and reporting such events to a security operator.

Different types of emergency alarm systems for buildings have in common that they include some kind of detector and also some way of indicating that the detector has been triggered. In the example of the standalone fire alarm unit, the detector could be a photoelectric detector or an ionization detector. When smoke particles enter the detector, the alarm unit is set off and a loud bell or horn is sounded, providing an indication of the detection. In case of the advanced monitoring systems, the camera can be seen as a detector, and the indication of the detection can be in the form of a message to the security operator. Another example is detectors in the form of microphones connected to software or hardware analysing captured sounds and comparing to typical profiles for sounds indicating an emergency, such as explosions or gunshots.

While all these emergency alarm systems have many advantages, there are also some disadvantages involved. In case of a standalone detector, it has the obvious disadvantage of not being noticed in all parts of a large building. This can be countered by including several standalone units, or by connecting the units to one another, such that if one of the units makes a detection, all the units will be triggered. In some cases, a detection by any of the units will also cause an automatic alarm to be sent to an alarm central alerting emergency personnel. However, in many cases, there is no indication of where in the building the detection was made.

Even if sophistication is added to the system by including individually addressable units, with position information logged for each unit, it may still be difficult to relay such position information to the emergency personnel in a prompt manner. This means that when the emergency personnel arrive at the site, it is often difficult for them to quickly understand where in the building they should focus their initial efforts, and valuable time may be wasted trying to find the location or locations of the emergency in the building. In addition, the site of the emergency may move within the building, such as when a weapon is fired at a number of different locations in the building. This especially a problem in case of large multi-level buildings such as schools or large apartment or office buildings.

Even if the position information of each unit being triggered may be available to a security operator, it may still be difficult for the emergency personnel to retrieve and use the information at the site of the emergency. There may e.g. be a lack of technical equipment for accessing the information, or logical access rights to the monitoring system may be missing. This could e.g. be the case when emergency personnel from another district is responding to the alarm. Again, valuable time may be wasted trying to locate the source of an alarm in a large building.

In addition, in case of an emergency spreading or moving through a building, not only the position of the triggered alarm unit, but also the time line is important. One example is that in the case of gas explosions in a large building it is useful to know if the site of the explosions is travelling in a certain direction. The same is true for gunshot detectors, where it is highly important to be able to understand where the shots have been heard, since there may be wounded people needing immediate help. It is also very important to know where the shots were last heard, so that the source of the gunshots may be located and stopped.

Hence, there is a need for an improved emergency alarm system where alarm location information can be quickly and easily transmitted to emergency personnel arriving at a large building.

SUMMARY OF THE INVENTION

In view of the above, an object of the present invention is to provide an emergency notification system where information on the location of the emergency in a large building is readily available in a convenient manner to emergency personnel.

In accordance with a first aspect of the invention, an emergency notification system for providing information at an outside of a building regarding emergency events occurring inside the building is provided, which comprises a set of sensors arranged at a plurality of sensor locations inside the building, a set of indicators arranged at a plurality of indicator locations, such that optical or thermal signals emitted from the indicators are detectable from outside the building, and a timer, wherein each sensor is associated with a nearby indicator, wherein each sensor is configured to detect a predetermined sound related to an emergency event, and to transmit event information to its associated indicator, in response to detecting the predetermined sound, wherein each indicator is configured to receive event information from its associated sensor and to emit a first optical or thermal signal, in response to receiving event information, wherein each indicator is configured to receive a timer signal from the timer and to change a property of the first optical or thermal signal based on the timer signal, such that the set of indicators together form a time variant indication, detectable from outside the building, of sensor locations in the building where the predetermined sound is detected.

This emergency notification system provides a convenient and simple way of visualizing the location(s) of an emergency event taking place inside a building, without requiring emergency personnel arriving at the building accessing surveillance systems or performing time-consuming and potentially dangerous searches for the emergency event site in the building. In this way the efforts of the emergency team can rapidly be focused on the most relevant parts of the building, and valuable time is not wasted trying to find the site of the emergency event within the building. By the time-variant indication provided by the indicators showing the most recent sensor detections differently to older detections it is possible to quickly understand which parts of the building have been affected by the emergency event and also where it recently moved or spread to.

Since the time-variant indication is detectable from outside the building, there is no need to login at a security system or enter the building without knowledge of where in the building the emergency event is taking place. In case of a fire, the time-variant indication will give valuable insight to which parts of the building the fire has spread, and also give a hint as to in which direction it is spreading. In case of an emergency event moving through a building, such as an unauthorized heavy vehicle moving within a building or a weapon being fired at various places, the time-variant indication gives insight into where there might be injured persons needing immediate medical care and where the perpetrator was last detected.

The time-variant indication may also prompt someone passing the building to call the emergency service and alert them to the situation, especially in the case of a visible optical signal being used by the indicators. E.g., in case of an automatic alarm to the emergency alarm central failing, this may save important time.

The property of the emitted first optical or thermal signal may be changed according to a predetermined scheme in accordance with the time elapsed according to the timer signal since the detection of the predetermined sound.

The property of the first optical or thermal signal changed in response to the timer signal may be one or more of wavelength or intensity. Each of these allows the indicators to provide various distinctly different signals that may be seen or detected also from a distance.

Each sensor may be associated with the closest indicator among the set of indicators, or, as an alternative, each sensor may be associated with an indicator located either in the same room in the building as that sensor, or on an outside surface of this room. Both of these options will provide the physical or spatial association between indicators and sensor that improves visualizing which parts of the building are involved in the emergency event.

The set of indicators may be connected in a mesh network, which makes it possible for the indicators to send information to each other. One example is that a first indicator, within the set of indicators, upon receipt of event information from its associated sensor, may be configured to send a mesh network message to all other indicators in the mesh network. In this way all other indicators are informed that there has been a detection of an emergency event within the building. The mesh network may be based on wired or wireless connections between the indicators. The mesh network may e.g. be provided as a cloud network, or the connections between the indicators may be provided via a local network.

The mesh network can, e.g., be used when a second indicator, within the set of indicators, upon receipt of the mesh network message, and in case the second indicator is currently not emitting the first optical or thermal signal, is configured to emit a second, time-invariant, optical or thermal signal, different to the first optical or thermal signal. In this way it can be indicated that the second indicator is functioning and ready to emit thermal or optical signals, but that its associated sensor has not (yet) detected any emergency. In addition, the emitting of the second thermal or optical signal from all indicators not having received any event information from their associated sensor will enhance the outside alarm function from the first optical or thermal signal, especially if optical signals are used, thereby notifying passers-by that something out of the ordinary is going on in the building. As previously noted, this could prompt someone passing the building to call the emergency service and alert them to the situation.

The emergency notification system may further comprise a memory configured to receive and store event information. In that way historic information on an emergency event can be retrieved and analysed at a later time. Each indicator may be configured to transmit, to the memory, event information received from its associated sensor, so that the event information can be stored in the memory for later use. The memory may be connected, via a wired or wireless connection, to the mesh network, thereby making it possible for the indicators to transmit the event information to the memory via the mesh network.

The event information stored in the memory may be used in an embodiment where the emergency notification system further comprises
  a. a replay request unit, configured to receive input from a user
  b. a control unit configured to control the set of indicators, and upon input from a user being received at the replay request unit:
    i. retrieve event information from the memory
    ii. control the set of indicators to perform a replay of the time variant indication in accordance with the event information retrieved from the memory.

In this embodiment it is possible quickly achieve a visualization of the historical overview of the progress of the emergency event over time, e.g. as the emergency response team arrives at the building. By requesting a replay at the replay request unit, the indicators may show the time variant indication from the start of the emergency event up until current time.

The replay request unit may be in the form of a push button switch arranged at the building. This is a simple and user-friendly way of allowing a user, i.e. a representative of the emergency services, to provide input to the control unit. No login or complicated access procedures are needed, instead the emergency personnel need only to locate the push button switch, which preferably is clearly marked on the building, and press it to request the replay of the time variant indication.

The predetermined sound which the sensors are configured to detect may be a predefined distress sound, an engine sound, an explosion sound, a collision sound or a gunshot sound. Additionally, or as an alternative, the predetermined sound may be an alarm sound from an alarm speaker, bell, buzzer, or horn. The sensors may be configured to detect one or more of these emergency event related sounds, all of which indicates that something out of the ordinary is going on in the building needing attention from the emergency or law enforcement services.

According to a second aspect of the invention, an emergency notification method for providing information at an outside of a building regarding emergency events occurring inside the building, comprises the following steps:
  providing a set of sensors arranged at a plurality of sensor locations inside the building, a set of indicators arranged at a plurality of indicator locations, such that optical or thermal signals emitted from the indicators are detectable from outside the building, and a timer, wherein each indoor sensor is associated with a nearby indicator,
  a sensor, within the set of sensors, detecting a predetermined sound related to an emergency event, and transmitting event information to its associated indicator, in response to detecting the predetermined sound, an indicator receiving event information from its associated sensor and emitting a first optical or thermal signal detectable from outside the building, in response to receiving event information, the indicator receiving a timer signal from the timer and changing a property of the first optical or thermal signal based on the timer signal, such that the set of indicators together form a time variant indication, detectable from outside the building, of sensor locations in the building where the predetermined sound is detected.

The second aspect of the invention is associated with the same advantages as described in relation to the first aspect.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The operations of any method disclosed herein do not have to be performed in the exact order disclosed, unless explicitly stated. Furthermore, the word "comprising" does not exclude other elements or steps.

BRIEF DESCRIPTION OF THE DRAWINGS

The above disclosed and other aspects of the present invention will now be described in more detail, with reference to the appended drawings illustrating embodiments of the invention.

Further, in the figures like reference characters designate like or corresponding parts throughout the several figures. Note that figures are not to scale for purposes of clarity.

DETAILED DESCRIPTION OF EMBODIMENTS

Figure 1:
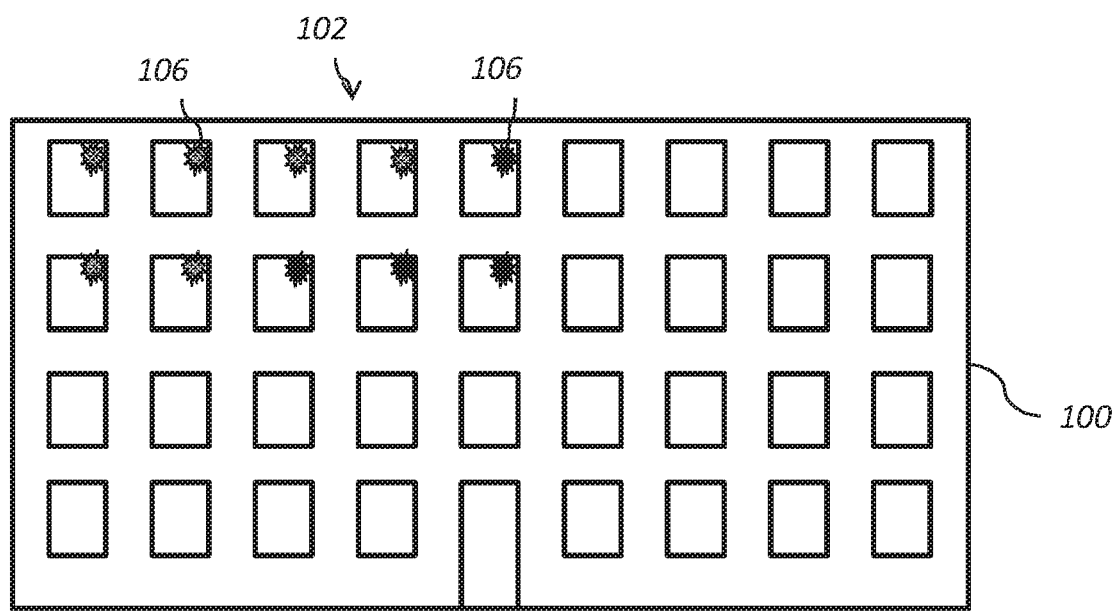
FIG. 1 illustrates an emergency notification system.
Figure 2:
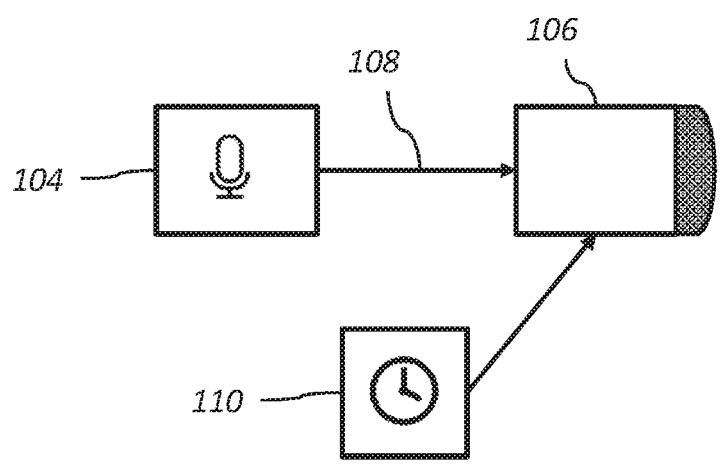
FIG. 2 shows details of the emergency notification system.

FIG. 1 shows a building 100 which is equipped with an emergency notification system 102 according to the invention. Details of the emergency notification system 102 are shown in FIG. 2. The emergency notification system 102 includes several sensors 104 arranged at a plurality of different sensor locations or positions inside the building 100 and several indicators 106, arranged at a plurality of different indicator locations or positions.

Each indicator 106 is able to emit an optical or thermal signal, or a combination thereof, and is positioned in such manner that the emitted signal is detectable or visible from outside the building 100. The indicators 106 are not necessarily placed on the outside of the building 100, instead the requirement on the indicator locations is that the signals emitted from the indicators 106 need to be detectable from outside the building 100. The indicators 106 may e.g. be placed on the inside of windows in the building 100, in case visible signals are used. In case thermal signal are used, the indicators should normally not be placed behind a regular window pane since the thermal signals will then not be detectable from the other side of the window.

In case visible signals are used, the indicators 106 may include an illuminator which is able to change colour or intensity, or the indicators 106 may include several different illuminators, each being different to the others as regards the property to be changed. As one example, the indicators 106 may include two or more LED illuminator units of different colours. When event information is received at an indicator 106, a LED of a first colour may be lit. After a certain time has passed, the LED of the first colour may be switched off, and a LED of a second colour may be lit instead. The indicators 106 may be e.g. be powered by solar cells or batteries or be connected to a power outlet.

As shown in FIG. 2, each of the sensors 104 is connected to or associated with one of the indicators 106 via a connection 108, which may be wired, e.g. based on Ethernet, I2C, SPI, RS422, RS485, or wireless, e.g. based on ZigBee, Bluetooth, IR, or visible light communication (VLC). Each indicator 106 is mounted in the vicinity or nearby its associated sensor 104, or in other words, each sensor 104 is matched in a physical or spatial sense to its associated indicator 106. A sensor 104 may e.g. be mounted in or next to the same room, on the same floor or within a certain spatial or physical distance to its associated indicator 106.

As a further option, more than one sensor 104 may be connected to one and the same indicator 106. An example is when a sensor 104 is placed in a windowless room (e.g. a bathroom) closer to the core of a building, that sensor 104 will be associated with the same indicator 106 as a sensor 104 placed closer to, such as in the same room as the indicator 106.

The sensors 104 include a microphone and an analysis unit configured to analyse the incoming audio signals from the microphone and to recognize one or more predetermined sounds associated with an emergency event. The predetermined sounds may be sounds that are audible to humans or sounds outside the human range of hearing (that can be used in so called silent alarms). The analysis unit may, e.g., use technology based on neural networks or other statistical methods for performing the recognition of the predetermined sounds or other technology for determining the likeness of an incoming sound to a specific predetermined sound. Such a predetermined sound may be in the form of any sound related to an emergency or distress related event that is relevant to a specific building, such as the sound of an alarm bell, alarm speaker, alarm buzzer or alarm horn, e.g. from a fire alarm, screaming or shouting sounds, gunshot, explosion, crash or collision sounds or the sound of an engine of a heavy vehicle inside a building.

On detection of such a predetermined sound, the sensor 104 will send event information via the connection 108 to its associated indicator 106. The event information may be in the form of a predefined message, a signal or other type of communication suitable to inform the indicator 106 that the sensor 104 has made a detection of a predefined sound. In case the sensor 104 is configured to detect several predefined sounds, it is not necessary that the event information includes which of the predetermined sounds was detected, only that a detection was made. However, the event information may in some cases include information on what type of predetermined sound was detected. This information could then be used to select a property of the first optical or thermal signal, e.g. such that if a fire alarm bell is the detected predetermined sound, a different first optical or thermal signal may be emitted than if a gunshot is the detected predetermined sound.

The sensor 104 may continue sending the event information to its associated indicator 106 for as long as the predetermined sound is detected, or it may send only one or a few repeated messages with event information to its associated indicator 106. The indicator 106 may also be configured to send a receipt acknowledgement back to the sensor 104, which may be used to prompt the sensor 104 to stop sending the event information to its associated indicator 106.

When the indicator 106 that is associated with the sensor 104 that made the detection receives event information from its associated sensor 104, this indicator 106 will emit a first thermal or optical signal (or a combination of thermal and optical signal) which is detectable from outside the building 100. In case an optical signal is used, it can be in the form of visible light or near-infrared, NIR, radiation and in case a thermal signal is used this can be in the form of heat radiation, such as short-wavelength, mid-wavelength or long-wavelength infrared radiation.

The first optical or thermal signal is either visible to the human eye, or, when NIR or heat radiation is used, detectable to a camera from outside the building. In case a NIR signal is used, a visible light camera with removed IR-filter can be used to detect the signal and visualize it to the human eye, and in case heat radiation is used a thermal camera can be used to detect the signal and visualize it to the human eye. It may be noted that a thermal camera is commonly a part of the standard equipment for a fire patrol. In any case, it will be possible to quickly grasp from looking at the outside of the building, possibly through a camera, in which part or parts of the building a sensor 104 has detected one or more of the predetermined sounds.

The indicators 106 are also connected to a timer 110 and receives a timer signal from the timer 112. There may either be one timer 110 included in or connected to each indicator 106, or several indicators 106 may be connected to and receive signals from the same timer. The connection between the timer and the one or more indicators 106 may be wired or wireless and may, e.g., be based on any of the technologies mentioned above for the connections in the mesh network between the indicators 106 and the sensors 104. Based on the timer signal, the indicator 106 will change a property of the first optical or thermal signal emitted from the indicator 106. The property that is changed may be the intensity of the signal or the wavelength (colour for a visible signal). In that way it will be possible to easily see how recently the detection was made in a specific part of the building 100.

The indicator 106 may be configured to not change any property of the first thermal or optical signal as long as its associated sensor 104 sends event information. This may be preferable when the predetermined sound relates to an emergency situation that moves through the building, such as explosions or a weapon being fired.

Alternatively, the indicator 106 may change the property of the first thermal or optical signal based on the time that has elapsed since the first event information was received at the indicator 106, regardless of whether the sensor 104 is still detecting the predetermined sound and sending the event information to its associated indicator 106. This may be preferable when the emergency event is of a type that does not so much move as spread through a building, such as when the predetermined sound is a fire alarm sound.

The different first signals emitted are illustrated in FIG. 1, where the indicators mounted on some of the windows flash a signal of a one colour and others a signal of another colour. For illustrative purposes the colours are shown as black or with a dotted pattern.

In FIG. 1 the dotted patterned signals are emitted by the indicators 106 on the windows where a certain amount of time has elapsed since the detection was made by the sensors 104 in the rooms behind these windows, and the black signals are emitted by the indicators 106 on those windows belonging to rooms where the detection by the sensors 104 was made more recently. In this way a time-variant indication of the emergency event taking place in the building 100 is shown at the outside of the building 100, such that an emergency service unit, e.g. a fire patrol or a law enforcement patrol, arriving at the building, is able to very quickly understand where in the building the primary focus of their efforts should be.

As an example, an indicator 106 may emit a red light signal directly upon receiving event information from its associated sensor 104, and when, e.g., 5 minutes has elapsed, it will switch to a yellow light signal which will remain until the system is reset. As another example, the indicator 106 may start by emitting a strong intensity signal and after a set time the intensity may be reduced, e.g. stepwise or by fading in a continuous manner from a higher intensity to a lower intensity. It would also be possible to change the property of the signal more than once. e.g. starting at red, and then changing to orange after some time has passed and to yellow after some more time has passed. It would also be possible to combine changes in both wavelength and intensity.

Figure 3:
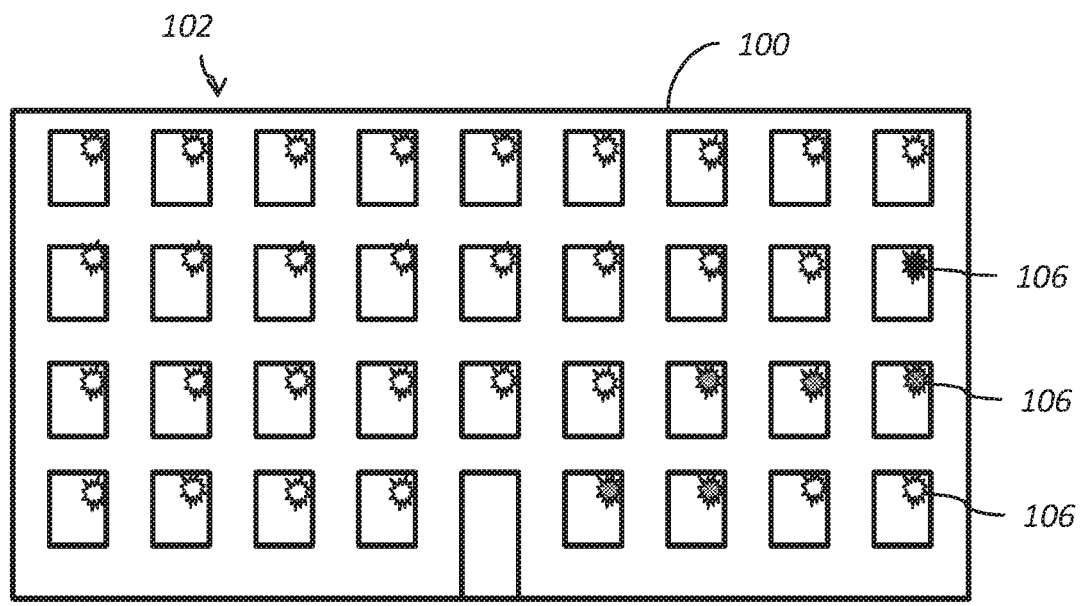
FIG. 3 shows another embodiment of the emergency notification system of FIG. 1.
Figure 4:
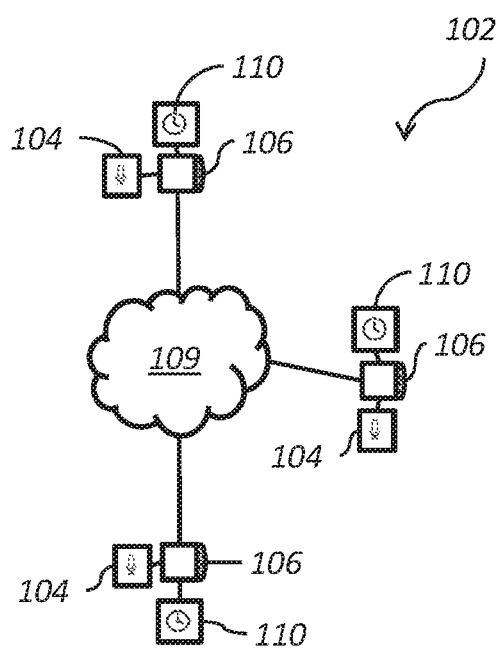
FIG. 4 shows a more detailed view of the FIG. 3 system.

FIGS. 3 and 4 illustrate a variant of the emergency notification system where the indicators 106 are connected to each other in a mesh network 109, which makes it possible to exchange information between the indicators 106. This is used to add another notification aspect to the system in FIG. 3, namely that as soon as one sensor 104 has made a detection and sent event information to its associated indicator 106, this indicator will notify all other indicators 106 via the mesh network, and all the other indicators 106 will emit a second, time-invariant, thermal or optical signal, thereby indicating that they are functioning but have not yet received any event information directly from their associated sensors 104. This second, time-invariant signal is illustrated as having no pattern in FIG. 3, and the first signal is illustrated as having black colour or a dotted pattern for the first signal having had the property change.

It may be noted that as soon as an indicator 106 receives event information from its associated sensor 104, it will switch to emitting the first optical or thermal signal, instead of the second optical or thermal signal.

As an example, an indicator 106, which receives event information from its associated sensor 104, may emit a red light signal, which changes into a yellow light signal after a certain time, and a sensor 106 which receives a message over the mesh network that another indicator 106 has received event information may emit a white light signal until it receives event information from its own associated sensor 104, whereupon it will switch to a red light signal, and then, after some time has passed, to a yellow light signal.

Figure 5:
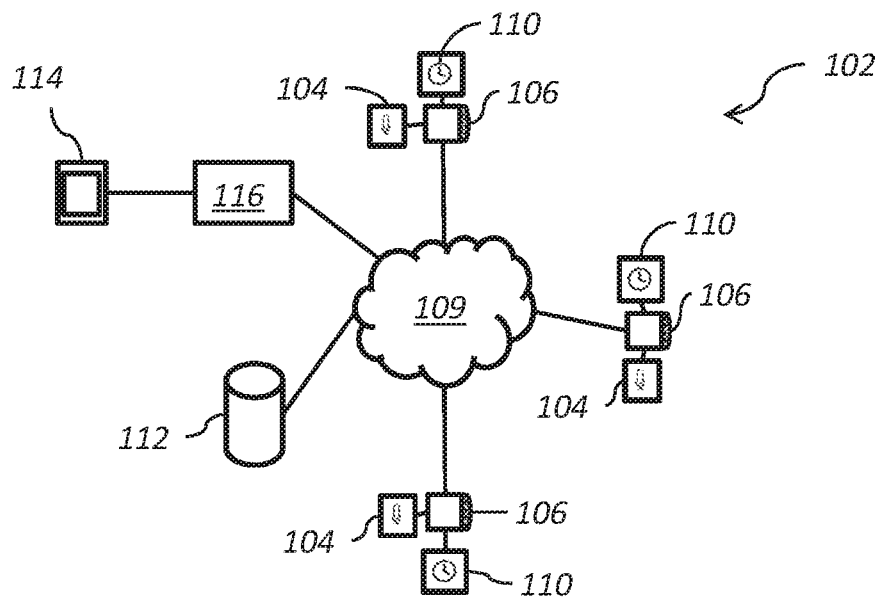
FIG. 5. shows yet another embodiment of the emergency notification system.

In FIG. 5 another variant of the emergency notification system is shown where the event information received by the indicators 106 is sent to and stored by a memory 112 which is in communication with (connected to) the indicators 106, typically via the mesh network 109. The indicators 106 will also add some kind of time stamp to the event information sent to the memory 112, based on the timer signal from the timer 110. Alternatively, the memory 112 may add such a time stamp upon receipt of each piece of event information. The time stamps may either be in a real time format, such as "12:15 am" or in some kind of relative or delta time, such as "event happened 15 minutes ago" or "signal from indicator was received 20 minutes ago". The addition of the memory 112 to the system 102 makes it possible to store historical data of how an emergency event has moved spread through the building 100.

Figure 6:
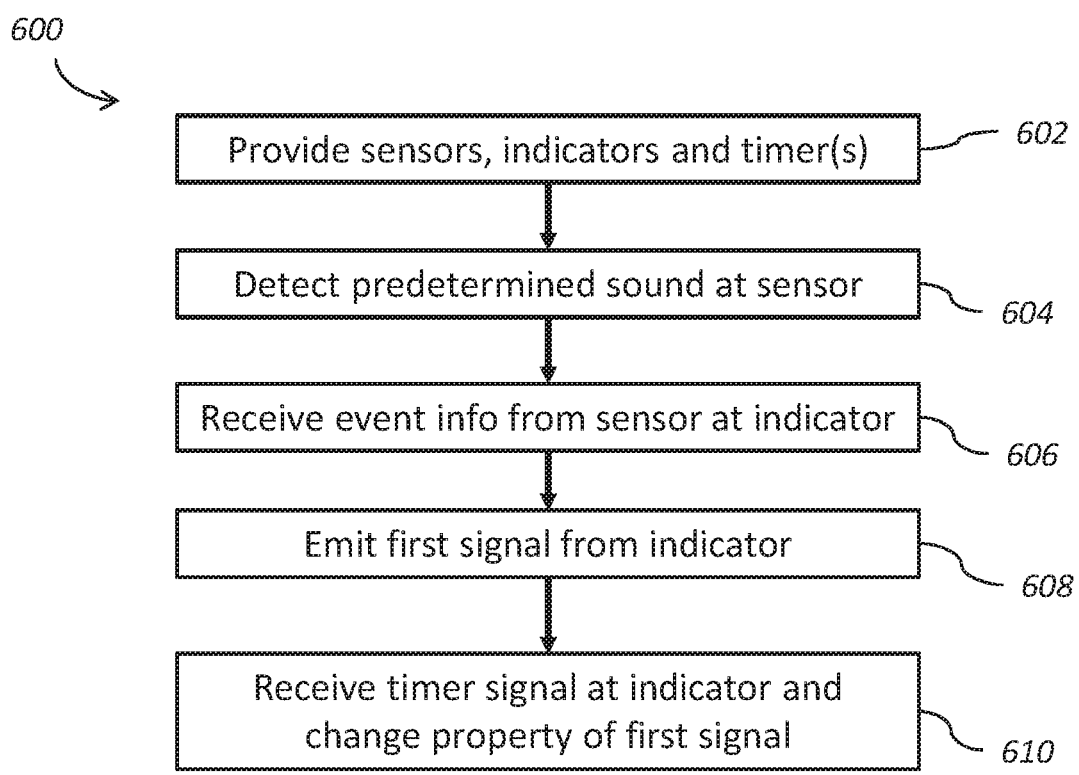
FIG. 6. is a flow chart illustrating an emergency notification method.

In addition, the emergency notification system 102 may include a replay request unit 114 arranged at or near the building 100. The replay request unit 114 may e.g. be in the form of a push button switch mounted at an outside wall of the building 100. A control unit 116 may be connected to the memory 112, the replay request unit 114 and the indicators 106, e.g. via the mesh network 109. The replay request unit 114 may also, as shown in FIG. 6, be connected to the control unit 116 directly and not via the mesh network 109.

As an alternative to a push button, the replay request unit 114 may be associatd with or provide a QR code, or a code sent via NFC or Bluetooth, to be read, scanned or received by a mobile device belonging to the emergency personnel positioned in the vicinity of the replay request unit 114. The mobile device will then use the code, e.g., via a pre-installed app, to connect to the emergency notification system 102 and request the playback. Yet another option would be for the replay request unit 114 to read, scan or receive such a code from the mobile device in order to initiate the playback.

When a user interacts with the replay request unit 114, typically by pushing the button of the push button switch, the control unit 116 will be notified of this user input, and, in response to the input, retrieve event information stored at the memory 112, and then instruct or control the indicators 106 to replay the time-variant indication from start of the emergency event. The replay could be a slow motion or a fast-forward replay or in real time. By watching the replay, it will then be possible to see where in the building 100 the emergency event originated, and how it moved or spread through the building 100.

When the replay has finished, the emergency notification system will be controlled by the control unit 116 to return to a current state. Since time-stamped event information received by the indicators 106 has been sent to the control unit 116 during the emergency event, including any new event information received during the playback, the control unit 116 will be able to set the state of all indicators 106 correctly.

It may be noted that the emergency notification system also will be equipped with a reset functionality, which will reset all indicators 106 to a neutral or start mode. In case the indicators 106 are connected to the control unit 116 via the mesh network 109, the control unit 116 may issue a reset command which will stop the indicators 106 from emitting the first and second optical or thermal signals until such time that one or more of the sensors 104 makes a detection of one or more of the predetermined sounds again, indicating that a new emergency event is taking place in the building 100. In case the indicators 106 are not connected to a control unit 116, each indicator 106 may be equipped with a reset button or the reset may take place automatically after a preset time period, which will be set to be longer than any reasonable time for an emergency event to run its course, such as a day or more.

FIG. 6 illustrates an emergency notification method 600 for providing information at an outside of a building regarding emergency events occurring inside the building. In step 602, sensors 104, indicators 106 and one or more timers 110 are provided in line with any of the previously described variants. In step 604, a predetermined sound is detected at a sensor 104. In step 606, the sensor 104 sends event information to an associated indicator 106, and in step 608 the indicator 106 emits the first signal. In step 610, the indicator 106 receives the timer signal, and, based on the timer signal, changes a property of the first signal.

In summary, the present invention relates to an emergency notification system 102 where indicators 106 are mounted on or in a building 100 in such a way that optical or thermal signals emitted from the indicators 106 form a time-variant indication detectable outside the building 100 of an emergency event taking place inside the building 100. Sensors 104 detecting a predetermined sound are mounted inside the building 100 and are each connected to a nearby indicator 106. When a sensor 104 makes a detection, it sends event information to its associated indicator 106 which will prompt the indicator 106 to emit a first optical or thermal signal. Based on a signal from a timer 110 connected to the indicator 106, a property of the first signal will change after a certain time has passed, thereby providing the time-variant indication.

The person skilled in the art realizes that the present invention is by no means limited to the embodiments described above. On the contrary, modification and variation are possible within the scope of the appended claims. As one example, various units described above may be implemented in hardware or in software, or in a combination thereof. As another example, the indicators could be placed on the roof of a building. This would typically be most useful for a one story building but could also be contemplated for a multi-story building. In the latter case, the indication might be used to point to a section of the building, but not a specific floor.

The invention claimed is:

1. An emergency notification system for providing information at an outside of a building regarding emergency events occurring inside the building, comprising a set of sensors arranged at a plurality of sensor locations inside the building, a set of indicators arranged at a plurality of indicator locations, such that optical or thermal signals emitted from the indicators are detectable from outside the building, and a timer,
   a. wherein each sensor is associated with a nearby indicator,
   b. wherein each sensor is configured to detect a predetermined sound related to an emergency event, and to transmit event information to its associated indicator, in response to detecting the predetermined sound,
   c. wherein each indicator is configured to receive event information from its associated sensor and to emit a first optical or thermal signal, in response to receiving event information,
   d. wherein each indicator is configured to receive a timer signal from the timer and to change a property of the first optical or thermal signal based on the timer signal, such that the set of indicators together form a time variant indication, detectable from outside the building, of sensor locations in the building where the predetermined sound is detected.

2. The emergency notification system of claim 1, wherein the property of the emitted first optical or thermal signal is changed according to a predetermined scheme in accordance with the time elapsed according to the timer signal since the detection of the predetermined sound.

3. The emergency notification system of claim 1, wherein the property of the first optical or thermal signal changed in response to the timer signal is one or more of wavelength or intensity.

4. The emergency notification system of claim 1, wherein each sensor is associated with the closest indicator among the set of indicators.

5. The emergency notification system of claim 1, wherein each sensor is associated with an indicator located either in the same room in the building as the sensor, or on an outside surface of the room.

6. The emergency notification system of claim 1, wherein the set of indicators are connected in a mesh network.

7. The emergency notification system of claim 6, wherein a first indicator within the set of indicators, upon receipt of event information from its associated sensor, is configured to send a mesh network message to all other indicators in the mesh network.

8. The emergency notification system of claim 7, wherein a second indicator within the set of indicators, upon receipt of the mesh network message, and in case the second indicator is currently not emitting the first optical or thermal signal, is configured to emit a second, time-invariant, optical or thermal signal, different to the first optical or thermal signal.

9. The emergency notification system of claim 1, further comprising a memory configured to receive and store event information.

10. The emergency notification system of claim 9, wherein each indicator is configured to transmit, to the memory, event information received from its associated sensor.

11. The emergency notification system of claim 9, further comprising
  a. a replay request unit, configured to receive input from a user
  b. a control unit configured to control the set of indicators, and upon input from a user being received at the replay request unit:
    i. retrieve event information from the memory
    ii. control the set of indicators to perform a replay of the time variant indication in accordance with the event information retrieved from the memory.

12. The emergency notification system of claim 11, wherein the replay request unit is a push button switch arranged at the building.

13. The emergency notification system of claim 1, wherein the predetermined sound is a predefined distress sound, an engine sound, an explosion sound, a collision sound or a gunshot sound.

14. The emergency notification system of claim 1, wherein the predetermined sound is an alarm sound from an alarm speaker, bell, buzzer or horn.

15. An emergency notification method for providing information at an outside of a building regarding emergency events occurring inside the building, comprising:
  a. providing a set of sensors arranged at a plurality of sensor locations inside the building, a set of indicators arranged at a plurality of indicator locations, such that optical or thermal signals emitted from the indicators are detectable from outside the building, and a timer, wherein each indoor sensor is associated with a nearby indicator,
  b. a sensor, within the set of sensors, detecting a predetermined sound related to an emergency event, and transmitting event information to its associated indicator, in response to detecting the predetermined sound,
  c. an indicator receiving event information from its associated sensor and emitting a first optical or thermal signal detectable from outside the building, in response to receiving event information,
  d. the indicator receiving a timer signal from the timer and changing a property of the first optical or thermal signal based on the timer signal, such that the set of indicators together form a time variant indication, detectable from outside the building, of sensor locations in the building where the predetermined sound is detected.

* * * * *